United States Patent [19]

Demura et al.

[11] Patent Number: 5,437,908
[45] Date of Patent: Aug. 1, 1995

[54] BATHROOM TISSUE AND PROCESS FOR PRODUCING THE SAME

[75] Inventors: Takeshi Demura; Teruo Uchiyama, both of Tokyo; Sadayuki Aoki; Minoru Ihara, both of Ehime, all of Japan

[73] Assignees: Jujo Kimberly K.K., Tokyo; Toyo Paper Mfg. Co., Ltd., Kawanoe, both of Japan

[21] Appl. No.: 241,673

[22] Filed: May 12, 1994

Related U.S. Application Data

[63] Continuation of Ser. No. 937,703, Sep. 1, 1992, abandoned.

[30] Foreign Application Priority Data

Sep. 2, 1991 [JP] Japan .................................. 3-221537

[51] Int. Cl.⁶ ...................... B32B 3/10; D21F 11/00
[52] U.S. Cl. .................................. 428/154; 428/43; 428/156; 428/172; 428/174; 428/298; 428/508; 428/537.5; 162/13; 162/123; 162/127; 162/157.7; 156/207; 156/290
[58] Field of Search ............... 428/172, 43, 156, 154, 428/174, 298, 508, 537.5; 162/13, 127, 123, 157.7; 156/309, 290

[56] References Cited

U.S. PATENT DOCUMENTS

| | | |
|---|---|---|
| 3,650,882 | 3/1972 | Thomas .................. 428/154 |
| 3,700,549 | 10/1972 | Croon et al. ............. 162/157.7 |
| 3,823,057 | 7/1974 | Roberts et al. .......... 428/43 |
| 4,012,281 | 3/1977 | Mayer . |
| 5,004,636 | 4/1991 | Parris .................... 428/43 |

FOREIGN PATENT DOCUMENTS

| | | |
|---|---|---|
| 0264676 | 4/1988 | European Pat. Off. . |
| 63-40555 | 2/1988 | Japan . |
| 64-64612 | 3/1989 | Japan . |
| 2-221489 | 9/1990 | Japan . |
| 865339 | 4/1961 | United Kingdom ........ 162/157.7 |
| 1420139 | 1/1973 | United Kingdom . |

*Primary Examiner*—P. C. Sluby
*Attorney, Agent, or Firm*—Fish & Richardson

[57] ABSTRACT

A bathroom tissue comprising an intermediate layer having on one side thereof a top layer, and on the other side thereof a bottom layer. The intermediate layer is comprised of about 100% wood pulp and the top and bottom layers are comprised of wood and rayon pulps mixed in a weight ratio of about 40-80:60-20. A process for producing the bathroom tissue is also disclosed.

9 Claims, No Drawings

BATHROOM TISSUE AND PROCESS FOR PRODUCING THE SAME

This is a continuation of U.S. application Ser. No. 07/937,703, filed Sep. 1, 1992, now abandoned.

BACKGROUND OF THE INVENTION

This application claims the priority of Japanese Patent Application No. 3-221537 filed Sep. 2, 1991, which in incorporated herein by reference.

This invention relates to bathroom tissue suitable for use in toilets equipped with a washing facility. The invention also relates to a process for producing such bathroom tissue.

Due to their convenience and obvious advantages for hygiene, toilets equipped with a washing facility are fast gaining acceptance. However, bathroom tissue, adapted for use with these toilets has not yet been developed.

In toilets of the type described above, lukewarm water is used for washing. However, conventional bathroom tissue is not only incapable of absorbing much water, but also tends to disintegrate upon contact with so much water.

Compared to bathroom tissue, tissue paper which has a wet strength modifier exhibits considerable strength in the presence of water, but, cannot be disposed of in flush toilets.

SUMMARY OF THE INVENTION

The present invention has been accomplished under these circumstances and provides bathroom tissue that is sufficiently water absorbent and strong to withstand use with copious amounts of water, that is dispersible in water flush toilets, and that also has an agreeable texture.

Another object of the present invention is to provide a process for producing this improved bathroom tissue.

DETAILED DESCRIPTION OF THE PREFERRED EMBODIMENTS

The first object of the present invention can be attained by the invention which relates to a bathroom tissue that has a three-layer structure comprising an intermediate layer which has on one side thereof a top layer or web A and the other side thereof a bottom layer or web A. The intermediate layer or web B comprises about 100% wood pulp and the top and bottom layers comprise wood pulp and rayon pulp mixed in a weight ratio of about 40 -80:60 -20.

In one embodiment of the present invention, the intermediate layer has a basis weight of about 15–25 g/m$^2$ and the top and bottom layers have a basis weight of about 15–30 g/m$^2$ with the three layers being embossed as they are superposed in a unitary assembly. In another embodiment of the present invention, the three-layer structure contains a water-soluble polymeric binder in an amount of about 0.5–10% in the top and/or bottom layers.

The first object of the present invention can also be attained by the invention which relates to a bathroom tissue that has a two-layer structure comprising a bottom layer or web B which has on one side thereof a surface layer or web A. The bottom layer comprises about 100% wood pulp and the surface layer comprises wood pulp and rayon pulp mixed in a weight ratio of about 40 - 80:60 - 20. In one embodiment of the present invention, the bottom layer has a basis weight of about 15–55 g/m$^2$ and that the surface layer has a basis weight of about 15–30 g/m$^2$, with the two layers embossed as they are superposed in a unitary assembly. In another embodiment of the present invention, the two-layer structure contains a water-soluble polymeric binder in an amount of 0.5–10% in the surface layer.

The second object of the present invention can be attained by the invention which relates to a process for producing bathroom tissue having a three-layer structure, comprising the steps of forming an intermediate layer from a paper stock slurry of about 100% wood pulp, sandwiching the intermediate layer between a top and bottom layers that are formed from paper stock slurry comprising wood pulp and rayon pulp mixed in a weight ratio of about 40 - 80:60 - 20, and embossing the three layers as they are superposed in a unitary assembly.

The sheet of paper which serves as the intermediate layer in the three-layer structure or as the bottom layer in the two-layer structure substantially comprises wood pulp which exhibits a satisfactory ability not only to absorb water but also to disperse rapidly in water. A slurry having this wood pulp dispersed therein is subjected to the usual paper making method on a conventional paper machine such as a cylinder machine, a Fourdrinier machine or a twin-wire machine. The wood pulp to be used is typically softwood or hardwood pulp and can be prepared by either a mechanical or a chemical process. The sheet of paper under consideration advantageously has a basis weight of about 15–25 g/m$^2$ in the three-layer structure and of about 15–55 g/m$^2$ in the two-layer structure. If the basis weight exceeds about 25 g/m$^2$ or about 55 g/m$^2$, the increased thickness or bulkiness will render the product bathroom tissue no longer easy to use. On the other hand, if the basis weight is less than about 15 g/m$^2$, the ability of the sheet to absorb and retain water is insufficient. It is also within the scope of the present invention to compose the intermediate layer in the three-layer structure or the bottom layer in the two-layer structure of a multiple ply which achieves a good balance between water absorption and ease of use when the intermediate layer or the bottom layer one of a two ply is formed from a sheet of paper having a basis about weight of 20 g/m$^2$ or less. In this case, it is preferred that the total basis weight of the multiple ply sheet is about 15–40 g/m$^2$ for the intermediate layer in the three-layer structure and about 15–55 g/m$^2$ for the bottom layer in the two-layer structure.

Each of the top and bottom layers in the three-layer structure or the surface layer in the two-layer structure is a sheet of paper comprising a mixture of wood pulp and rayon pulp. The wood pulp may be the same as that used to prepare the intermediate layer in the three-layer structure or the bottom layer in the two-layer structure. The rayon pulp may either comprise viscose rayon or cuprammonium rayon and it is typically used after being cut to a size of less than about 10 mm with a diameter of 1–8 deniers, preferably 4–6 mm with a diameter of 1–2 deniers. Since the rayon pulp has hydrophilicity which is characteristic of cellulose, it can be readily mixed with the wood pulp to prepare paper. Further, the rayon pulp has a better texture and a greater strength than the wood pulp and, hence, by mixing the two kinds of pulp, a paper can be prepared that provides a better feel and that also has a satisfactory strength in water. A particular advantage will result from using rayon pulp of a fine denier since the ability to absorb water is improved and, at the same time, increased softness will provide a better feel.

The mixing ratio of wood pulp to rayon pulp in each of the top and bottom layers in the three-layer structure and the surface layer in the two-layer structure is about 40 - 80:60 - 20, preferably about 65 - 75:35 - 25; in other words, the ratio of rayon pulp must be adjusted to about 20–60%. The ratio of rayon pulp to be contained in the top and bottom layers in the three-layer structure and the surface layer in the two-layer structure is determined by four factors, i. e., water absorption, water dispersibility, touch to the skin and service strength. If the ratio of rayon pulp is unduly low, the service strength of the final product will decrease and, at the same time, its feel will deteriorate. If the ratio of rayon pulp is excessive, water absorption by the final product is impaired. In either case, the final product is not suitable for use in the special application contemplated by the present invention.

In the top and bottom layers in the three-layers structure or the surface layer in the two-layer structure, the sheet of paper comprising a mixture of wood pulp and rayon pulp has desirably a basis weight of about 15–30 $g/m^2$ irrespective of whether the bathroom tissue to be manufactured has a two- or three-layer structure. The total basis weight of the bathroom tissue is desirably adjusted to about 30–85 $g/m^2$ for the two-layer structure containing the bottom layer and about 45–85 $g/m^2$ for the three-layer structure containing the intermediate layer. If the basis weight of the bathroom tissue is excessive, it will become rigid enough to cause inconvenience in use. In the ease of the three-layer structure, the mixing ratio of wood pulp to rayon pulp and the basis weight may be adjusted to differ in the top and bottom layers. If this is to be done, it is advantageous from an economic viewpoint to reduce the use of rayon pulp in the sheet on the side opposite the use side by mixing in a comparatively small amount or by reducing the basis weight of that side. In the ease of the two-layer structure, the sheet of paper comprising the mixture of wood and rayon pulps is used as a surface that is to contact the private parts. If desired, the bathroom tissue of the present invention as it comprises two or three layers in superposition may be used after it is folded in two times or more. Whether the bathroom tissue of the present invention has a two- or three-layer structure, the use side is desirably provided by the top or surface layer and using the bottom layer on that side should be avoided.

In the present invention, the intermediate layer is sandwiched between the top and bottom layers to form a three-layer structure or the bottom layer is overlaid with the surface layer to form a two-layer structure is embossed to provide a unitary assembly of the individual layers while creating a soft feel. A mold or roll having a multiple of elevations and/or depressions is pressed against one or both sides of the superposed structure or a pair of molds or rolls, one being male and the other being female, are pressed from both sides of the superposed structure. As a result of this treatment, an embossment is produced on at least one surface of the structure.

If the fibers composing the sheet serving as the top and bottom layers in the three-layer structure and the surface layer in the two-layers structure are not fixed securely, rayon pulp can potentially shed off as particles From the sheet although the amount of shedding fibers may be slight. This problem can be effectively avoided by adding a water-soluble polymeric binder to the top and/or bottom layers and the surface layer in an amount of about 0.5–10%, preferably about 1.5–3.0%, on the basis of the total weight of wood and rayon pulps. Exemplary water-soluble polymeric binders include poly(vinyl alcohol), carboxymethyl cellulose, poly(acrylic acid), acrylic acid copolymers, poly(methacrylic acid), methacrylic acid copolymers, polyacrylamide, acrylamide copolymers, poly(vinyl pyrrolidone), poly(vinyl ether), sulfonated polystyrene and iraconic acid copolymers. If the addition of these water-soluble polymeric binders is unduly small, their effect will not be attained; if their addition is excessive, various troubles will occur during manufacture such as the staining of the dryer used in the drying step.

The bathroom tissue of the present invention is capable of absorbing and retaining a large amount of water since a sheet of paper comprising about 100% wood pulp is used as the intermediate layer in the three-layer structure or as the bottom layer in the two-layer structure. On the other hand, the layer comprising about 100% wood pulp, if it absorbs a large amount of water, will experience a marked drop in strength, so during use, it will easily disintegrate. In the bathroom tissue of the present invention, at least one side of the intermediate layer of the three-layer structure or the bottom layer of the two-layer structure which is to contact the private parts is covered with the top and/or bottom layers, or surface layer which is a sheet of paper comprising wood and rayon pulps as mixed in the proportions of about 40 - 80:60 - 20. Therefore, the intermediate layer of the three-layer structure or the bottom layer of the two-layer structure will not make direct contact with the private parts, nor will it experience any trouble such as rupture or twist. As a further advantage, those layers are capable of retaining the initial sheet form even if they absorb a large amount of water. In contrast, the top layer of the three-layer structure and the surface layer of the two-layer structure which are to make direct contact with the private parts are comprised of a pulp mixture about 20–60% of which is rayon pulp. Hence, it has sufficient wet strength against water to experience neither rupture nor twist during use. In addition, the top layer and surface layer provide a soft feel. Further, the top layer and surface layer which contain about 40–80% wood pulp have a certain degree of water absorbency. Hence, they absorb part of the water present, permitting the remainder to be rapidly carried for permeation into the intermediate or bottom layer which has great ability to absorb and retain water. The bottom layer in the three-layer structure will function in almost the same manner as the top and surface layers.

As a further advantage, a sheet of paper that is prepared solely from wood pulp and which forms the intermediate layer in the three-layer structure or bottom layer in the two-layer structure as well as the sheet of paper that is prepared from a mixture of wood and rayon pulps and which forms the top and bottom layers in the three-layers structure and the surface layer structure in the two-layer structure will be composed of unbound constituent fibers and accordingly will disperse upon continued stirring in water. Hence, the bathroom tissue of the present invention can be directly disposed of in flush toilets.

Sheets having excellent water absorbency and service strength can be produced by adjusting the basis weight of the intermediate layer to about 15–25 $g/m^2$ and that of the top and bottom layers to about 15–30 $g/m^2$ in the case of the three-layer structure, or adjusting the basis weight of the bottom layer to about 15-55 g/m² and that of the surface layer to about 15-30 g/m² in the case of the two-layer structure. If the three or two layers embossed as they are superposed in a unitary assembly, softness of paper will be created to provide an even better feel.

If a water-soluble polymeric binder is added to the top and/or bottom layers and the surface layer in an amount of 0.5-10% of the total pulp weight, the fixation of the rayon pulp in the sheet is secured to prevent the pulp fibers from shedding as particles.

As described above, the intermediate layer of the bathroom tissue of the present invention is prepared different in composition from both the top and bottom layers (in the ease of a three-layer structure). In addition, rayon pulp is contained in the top and bottom layers in the specified proportion. As a result, the bathroom tissue of the invention is satisfactory in all aspects of performance, i.e., water absorption, water dispersibility, feel and service strength.

The following examples are provided for the purpose of further illustrating the present invention but are in no way to be taken as limiting.

EXAMPLE 1

A sheet having a basis weight of 20 g/m² was prepared from a slurry of 100% softwood pulp using a cylinder paper machine. The sheet was used as the intermediate layer. Sheets for use as the top and bottom layers were prepared by the following method: softwood pulp and rayon pulp (1.5 d; fiber length=5 mm) were mixed in a weight ratio of 75:25 and, to the mixture, poly(vinyl alcohol) was added in an amount of 3% of the total pulp weight, thereby providing slurry; using the slurry, sheets having a basis weight of 20 g/m² were obtained.

The intermediate layer was sandwiched between the top and bottom layers and the respective layers, as they were placed in superposition, were embossed over the entire surface to prepare bathroom paper in which the three constituent layers formed a unitary assembly.

EXAMPLES 2-6

Five additional samples of bathroom tissue were prepared by repeating the procedure of Example 1 except that the mixing ratio of softwood pulp to rayon pulp in the sheet to be used as the top and bottom layers was varied as 90:10, 55:45, 45:55, 30:70 and 0:100.

To check their quality and performance, the samples of bathroom tissue which were prepared in Examples 1-6 were tested in the following manner:

(1) Ten volunteers used five specimens of each of the samples on toilet equipped with a washing facility and they performed a subjective evaluation of each sample with respect to various parameters. Each of the samples had an area of 20 cm ×23 cm and was folded in four times before it was used. The scores given by each volunteer were added up to provide an overall rating for each sample in accordance with the following criteria:
⊙ ... excellent
o ... good
Δ ... fair
x ... poor (2) The test parameters were as follows;
Water absorbency ... The ability of bathroom tissue to absorb water and moisture.
Water dispersibility ... The ease with which bathroom tissue is dispersed and disposed of in a flush toilet.
Touch to the skin ... The Feel of the bathroom tissue.
Service strength ... The ability to withstand the action of wiping off water without rupture twist.

The results are shown in Table 1 below.

TABLE 1

| Results of Testing for Quality and Performance | | | | | | |
|---|---|---|---|---|---|---|
| Mixing ratio | 90:10 | 75:25 | 55:45 | 45:55 | 30:70 | 0:100 |
| Water absorbency | ⊙ | ⊙ | ⊙ | ○ | Δ | X |
| Water dispersibility | ⊙ | ⊙ | ⊙ | ⊙ | ○ | ○ |
| Touch to the skin | Δ | ○ | ○ | ○ | ○ | ⊙ |
| Service Strength | X | ⊙ | ⊙ | ⊙ | ⊙ | ⊙ |

Note:
"Mixing ratio" refers to that of wood pulp to rayon pulp in the top and bottom layers.

As is clear from Table 1, when the ratio of rayon pulp in its mixture with wood pulp from which sheets were prepared for making the top and bottom layers was 10%, the bathroom tissue had such a low wet strength against water that it was either ruptured or twisted during use. When the ratio of rayon pulp was 25%, the service strength was satisfactory and, in addition, the feel was improved. On the other hand, when the content of wood pulp was 30% or 0%, the ability of the top and bottom layers to absorb water momentarily was insufficient to permit passage of water through those layers to reach the intermediate layer, where it would otherwise be absorbed and retained. When the ratio of wood pulp was 45%, the water absorbency was markedly improved. It can therefore be seen that only when the mixing ratio of wood pulp to rayon pulp is controlled as specified herein, bathroom tissue can be produced that permits the intermediate layer to exhibit its water absorbing ability to the fullest extent and which yet is improved in service strength and feel.

EXAMPLE 7

A sheet having a basis weight of 45 g/m² was prepared from a slurry of 100% softwood pulp using a cylinder paper machine. The sheet was used as the bottom layer. A sheet for use as the surface layer was prepared by the following method; softwood pulp and rayon pulp (2 d. fiber length=4 mm) were mixed in a weight ratio of 50:50 and, to the mixture, poly(vinyl alcohol) was added in an amount of 1.5% of the total pulp weight, thereby preparing a slurry; using the slurry, a sheet having a basis weight of 15 g/m² was obtained.

The sheet forming the surface layer was superposed on the sheet forming the bottom layer, thereby making a sample of bathroom tissue having a two-layer structure.

The bathroom tissue thus prepared was suitable for use after it was folded in two or four times, with the bottom surface layer forms the use layer. It performed satisfactorily in each of the tests conducted as in Examples 1-6.

The bathroom tissue of the present invention is characterized by a two- or three-layer structure in which a sheet of paper comprising about 100% wood pulp and a sheet of paper comprising an about 40 - 80: 60 - 20 mixture of wood and rayon pulps are superposed in such a way that the sheet comprising the pulp mixture will form the use layer. When this bathroom tissue is used go wipe off a large amount of water, the sheet of paper comprising about 100% wood pulp will rapidly absorb the water since it has the great ability to absorb and retain water, whereas the sheet of paper comprising the pulp mixture which comes into contact with the skin imparts a soft feel. Furthermore, not only the sheet that is solely prepared from wood pulp but also the sheet that is prepared from the pulp mixture with no more than about 60% rayon pulp has good water dispersibility and, hence, the bathroom tissue of the present invention can be directly disposed in flush bathrooms.

The bathroom tissue of the present invention can be used with greater ease if the following additional conditions are met: the basis weight of the intermediate layer and that of the top and bottom be adjusted to layers about 15-25 g/m² and about 15-30 g/m², respectively, in the case of a three-layer structure, or the basis weight of the bottom layer and that of the surface layer be adjusted to about 15-50 g/m² and about 15-30 g/m², respectively; a small amount of a water-soluble polymeric binder be added to the top and/or bottom layers, and the surface layer and the two or three layers placed in superposition be embossed in a unitary assembly.

The bathroom tissue of the present invention is best suited for use on toilet equipped with a washing facility. It should, be noted, however, that said bathroom tissue can also be used advantageously in conventional toilets and that it can be sold on the market in various forms such as rolls of a suitable size or portable sheets that are cut to convenient lengths.

What is claimed is:

1. A bathroom tissue for use with toilets equipped with a washing facility obtained by a process comprising the steps of:
    (a) preparing web A from a paper stock slurry, the web A comprising wood pulp and rayon pulp mixed in a weight ratio of from about 40:60 to about 80:20;
    (b) preparing web B from a paper stock slurry, said web B comprising about 100% wood pulp; and
    (c) superposing said web B and two webs A to sandwich web B between said two webs A, wherein said two webs A and said web B are not permanently attached to one another and said bathroom tissue is dispersable in water.

2. A bathroom tissue as claimed in claim 1, wherein said web B has a basis weight of about 15-25 g/m² and said two webs A have a basis weight of about 15-30 g/m² respectively.

3. A bathroom tissue as claimed in claim 1, wherein said three webs are embossed as said layers are superposed in a unitary assembly.

4. A bathroom tissue as claimed in claim 1, wherein a water-soluble polymeric binder is added to said two webs A in an amount of about 0.5-10% of the total weight of the wood and rayon pulps.

5. A bathroom tissue for use with toilets equipped with a washing facility obtained by a process comprising the steps of:
    (a) preparing web A from a paper stock slurry, said web A comprising wood pulp and rayon pulp mixed in a weight ratio of from about 40:60 to about 80:20;
    (b) preparing web B from a paper stock slurry, said web B comprising about 100% wood pulp; and
    (c) superposing said web A and said web B, wherein said web A and said web B are not permanently attached to each other and said bathroom tissue is dispersable in water.

6. A bathroom tissue as claimed in claim 5, wherein said web B has a basis weight of about 15-55 g/m² and said web A has a basis weight of about 15-30 g/m².

7. A bathroom tissue as claimed in claim 5, wherein said two webs are embossed as said webs are superposed in a unitary assembly.

8. A bathroom tissue as claimed in claim 5, wherein a water-soluble polymeric binder is added to said web A in an amount of about 0.5-10% of the total weight the wood and rayon pulps.

9. A process for producing a bathroom tissue which is rapidly dispersable in water comprising the steps of:
    a) forming web B from a paper stock slurry of about 100% wood pulp which retains its original form even after absorbing water;
    b) sandwiching said web B between two webs A which are formed from a paper stock slurry comprising wood and rayon pulps mixed in weight ratios of about 40-80:60-20; and
    c) embossing said three webs as said webs are superposed in a unitary assembly such that said three webs are not permanently attached.

* * * * *